US007693648B2

(12) United States Patent
Klein et al.

(10) Patent No.: US 7,693,648 B2
(45) Date of Patent: Apr. 6, 2010

(54) SYSTEM AND METHOD FOR DETECTING MISASSEMBLY OF AN EXHAUST AFTERTREATMENT SYSTEM OF A MACHINE

(75) Inventors: Jeffrey D. Klein, Princeville, IL (US);
Richard Thompson, Peoria, IL (US);
Timothy Davis, Washington, IL (US);
Clayton Walenta, Peoria, IL (US);
Michael S. Thornton, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 267 days.

(21) Appl. No.: 11/986,816

(22) Filed: Nov. 27, 2007

(65) Prior Publication Data
US 2009/0138185 A1 May 28, 2009

(51) Int. Cl.
*G06F 19/00* (2006.01)
*F01N 3/02* (2006.01)

(52) U.S. Cl. ............... 701/114; 60/311; 702/182
(58) Field of Classification Search ............ 701/101, 701/102, 114, 115; 702/81, 182, 183, 185; 60/274, 282, 297, 299, 391, 311
See application file for complete search history.

(56) References Cited

U.S. PATENT DOCUMENTS

| 5,012,414 A | 4/1991 | Ishii et al. |
| 5,995,916 A * | 11/1999 | Nixon et al. ............... 702/182 |
| 6,792,347 B2 | 9/2004 | Posselt |
| 6,948,486 B2 | 9/2005 | Oakes et al. |
| 7,077,082 B2 * | 7/2006 | Bloms et al. ............ 123/90.12 |
| 7,263,825 B1 | 9/2007 | Wills et al. |
| 7,418,321 B2 * | 8/2008 | Boutin ..................... 701/29 |
| 2004/0267398 A1 | 12/2004 | Maske et al. |
| 2005/0114012 A1* | 5/2005 | Zhu et al. ................ 701/114 |
| 2007/0100519 A1* | 5/2007 | Engel ..................... 701/33 |
| 2009/0198464 A1* | 8/2009 | Clarke et al. ............ 702/82 |

FOREIGN PATENT DOCUMENTS

| DE | 10026213 | 11/2001 |
| EP | 0691465 | 1/1996 |
| EP | 1333170 | 8/2003 |
| EP | 1724458 | 11/2006 |
| JP | 2005038492 | 12/2004 |

* cited by examiner

*Primary Examiner*—Willis R Wolfe, Jr.
(74) *Attorney, Agent, or Firm*—Liell & McNeil

(57) ABSTRACT

A method of detecting an assembly condition, such as, for example, a misassembly, of an exhaust aftertreatment system of a machine includes a step of executing an aftertreatment assembly diagnostic algorithm. The executing step includes detecting an electronic identification feature of an aftertreatment component of the exhaust aftertreatment system, and comparing the electronic identification feature to an expected value.

20 Claims, 4 Drawing Sheets

| Voltage | Particulate Filter Serial Number |
|---|---|
| 0 | 012345678 |
| 0.50 | • |
| 0.75 | • |
| 1.01 | • |
| 1.29 | • |
| 1.56 | • |
| 1.83 | • |
| 2.11 | • |
| 2.38 | 123456789 |

Figure 4

SYSTEM AND METHOD FOR DETECTING MISASSEMBLY OF AN EXHAUST AFTERTREATMENT SYSTEM OF A MACHINE

TECHNICAL FIELD

The present disclosure relates generally to detecting misassembly of an exhaust aftertreatment system of a machine, and more particularly to identifying an aftertreatment component of the exhaust aftertreatment system using an electronic identification feature.

BACKGROUND

Recent governmental regulations have prompted development and application of exhaust aftertreatment systems to reduce particulate matter emissions from both on-highway and off-highway machines or vehicles. Exhaust aftertreatment systems typically include an aftertreatment component, such as, for example, a particulate filter. A particulate filter may be a ceramic device that collects particulate matter in the exhaust stream by physical filtration. The collected particulate matter may be continuously or periodically removed from the particulate filter through one of many forms of regeneration, such as thermal regeneration. Other aftertreatment components may include a NOx adsorber, a catalytic converter, or any other known aftertreatment device.

Manufacturers of engines for these on-highway and off-highway machines are required to obtain an emissions certification from the U.S. Environmental Protection Agency (EPA) for each of their engines and/or engine families. This certification confirms that an engine, including the exhaust aftertreatment system provided with the engine, complies with the applicable on-highway or off-highway emissions standards and requirements. The compliance may be based on information supplied to the EPA by the manufacturer of the engine and/or aftertreatment system. This may prove problematic, however, for machine assembly plants that assemble different aftertreatment components to different types of engines, especially if two or more of the aftertreatment components have similar mating features. This may also prove problematic for manufacturers that ship an engine separately from an aftertreatment component, such as a particulate filter, for later assembly. In either case, if the aftertreatment component and engine are mismatched, such as by mating the wrong particulate filter to the right engine, the certification that was based on a specific configuration may no longer be accurate.

U.S. Pat. No. 6,792,347 teaches a method of installation-exchange protection of two measuring sensors in a divided catalytic converter system. A circuit is provided for reading in a voltage from each of the two sensors. A diagnostic module compares the voltage characteristics from each sensor to a value stored in memory to determine if each of the sensors is positioned correctly. This reference, however, does not contemplate the electronic identification of a particulate filter assembly and a comparison of that identification to a current engine to ensure proper assembly.

The present disclosure is directed to one or more of the problems set forth above.

SUMMARY

In one aspect, a method of detecting an assembly condition of an exhaust aftertreatment system of a machine includes a step of executing an aftertreatment assembly diagnostic algorithm. The method also includes steps of detecting an electronic identification feature of an aftertreatment component of the exhaust aftertreatment system, and comparing the electronic identification feature to an expected value.

In another aspect, a machine includes an internal combustion engine having an exhaust outlet. An aftertreatment component is disposed along the exhaust outlet and includes an identification circuit and an electronic identification feature. An electronic controller includes a first port in communication with the identification circuit. The electronic controller includes an aftertreatment assembly diagnostic algorithm and is configured to detect the electronic identification feature, and compare the electronic identification feature to an expected value stored in a memory.

In still another aspect, a particulate filter assembly includes at least one sensor circuit and at least one identification circuit configured to communicate with an electronic controller. At least one resistor, causing a predetermined resistance, is disposed along the identification circuit. The predetermined resistance is indicative of a characteristic of the particulate filter assembly.

BRIEF DESCRIPTION OF THE DRAWINGS

FIG. 4 is an exemplary table utilized by the method of FIG. 3.

DETAILED DESCRIPTION

Figure 1:
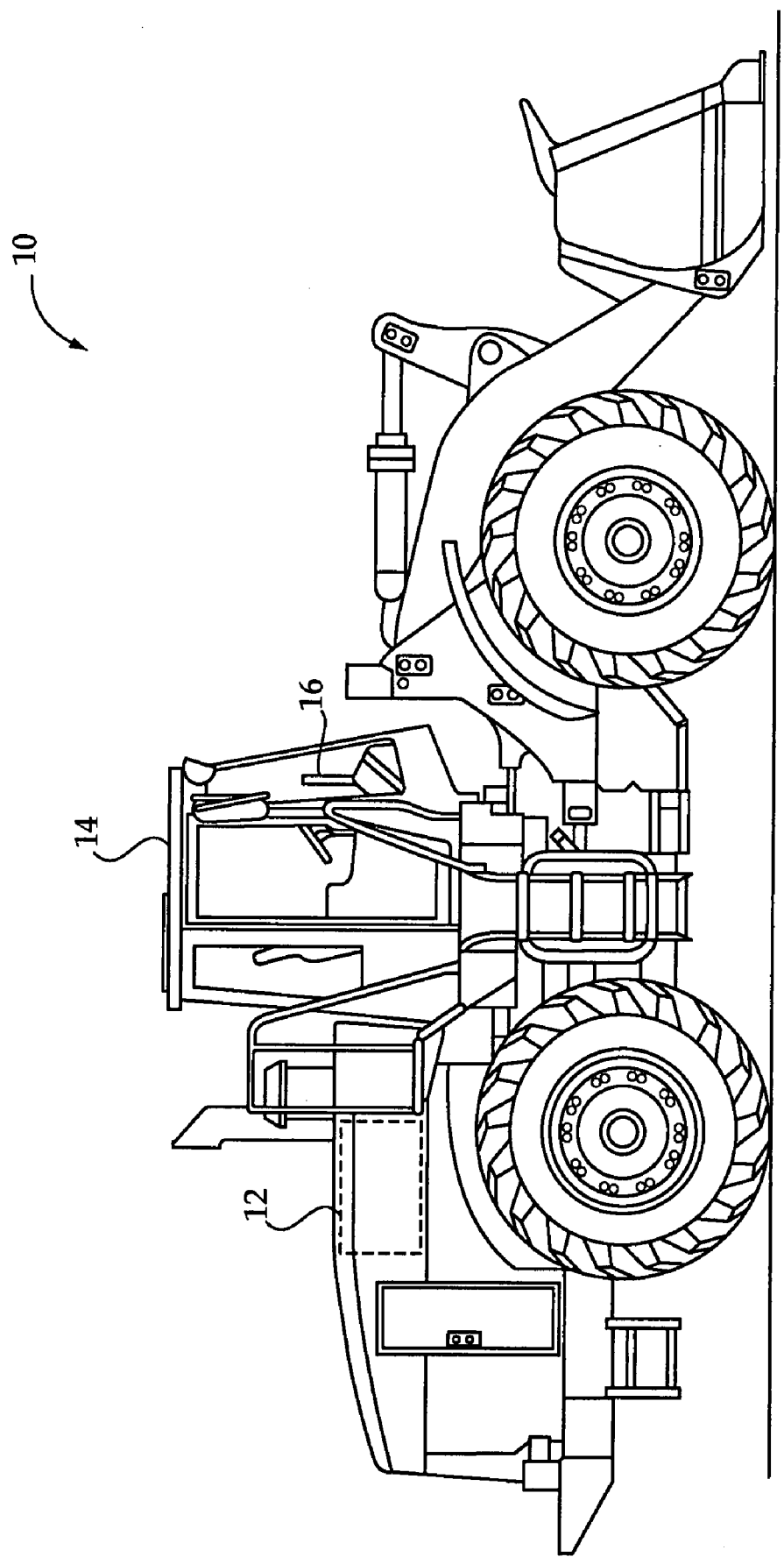
FIG. 1 is a side diagrammatic view of a machine according to the present disclosure.

An exemplary embodiment of a machine 10 is shown generally in FIG. 1. The machine 10 may be an off-highway vehicle, as shown, or any other machine or vehicle having an exhaust aftertreatment system 12 for treating an exhaust of the machine 10. The machine 10 may also include an operator control station 14, including an operator display 16. The exhaust aftertreatment system 12 is shown in greater detail in FIG. 2 and may include one or more components for removing various chemical compounds and particulates from exhaust gas produced by an engine, such as an internal combustion engine 20, of the machine 10.

The internal combustion engine 20 may utilize diesel fuel, gasoline, or one of various other fuels and may be in fluid communication with an exhaust outlet 22. Specifically, an exhaust gas produced by the internal combustion engine 20 may be transported from the internal combustion engine 20 and into the ambient air via the exhaust outlet 22. An aftertreament component 24 may be employed to improve emissions from the internal combustion engine 20. Although the aftertreatment component 24 is described hereinafter as a particulate filter assembly 24a, it should be appreciated that any other known aftertreatment component 24 is contemplated for use with the present disclosure.

The particulate filter assembly 24a, such as, for example, a diesel particulate filter assembly, may be disposed along the exhaust outlet 22 as part of the exhaust aftertreatment system 12 for the internal combustion engine 20. Particulate filters, such as particulate filter assembly 24a, may consist of one or more filter sections for removing particulate matter from the exhaust stream by physical filtration. It should be appreciated that the particulate filter assembly 24a may be sized and/or configured to reduce particulate matter emissions from the internal combustion engine 20 an amount necessary to comply with emissions regulations, such as, for example, emissions requirements provided by the U.S. Environmental Protection Agency (EPA).

The particulate filter assembly 24a may include one or more sensors, such as sensors 26 and 28, disposed along sensor circuits 30 and 32 within a housing of the particulate filter assembly 24a. In one embodiment, sensors 26 and 28 may be disposed within a sensor box 34 of the particulate filter assembly 24a, as shown. Sensor 26, for example, may include a pressure sensor for detecting an inlet pressure of the particulate filter assembly 24a. According to one embodiment, sensor 26 may include a delta pressure sensor for determining a pressure drop across the particulate filter assembly 24a. According to another embodiment, two pressure sensors may be utilized for determining a pressure drop across the particulate filter assembly 24a. Sensor 28 may include a temperature sensor for sensing a temperature of the one or more filter sections of the particulate filter assembly 24a. Monitoring one or both of the sensors 26 and 28 may provide an indication of a load of the particulate filter assembly 24a and, therefore, whether or not the particulate filter assembly 24a needs regeneration and/or whether a regeneration process is complete. It should be appreciated that a "load" of the particulate filter assembly 24a may represent an accumulation of particulate matter within the particulate filter assembly 24a.

The particulate filter assembly 24a or, more specifically, the sensor box 34 may also include an electronic identification feature 36 disposed along an identification circuit 38. The electronic identification feature 36 may include a resistor or other component that uniquely identifies the exhaust aftertreatment system 12 or, more specifically, the particulate filter assembly 24a. According to one embodiment, the electronic identification feature 36 includes a predetermined resistance, such as that caused by a resistor, along the identification circuit 38. According to a further embodiment, the electronic identification feature 36 includes a predetermined voltage of the identification circuit 38. Yet alternatively, one or both of sensors 26 and 28 may provide a signal along one or both of the sensor circuits 30 and 32 that identifies the particulate filter assembly 24a. According to a further example, a microprocessor or microcontroller may be provided within the sensor box 34 and may be configured to provide a unique identification feature of the particulate filter assembly 24a. It should be appreciated that any electronic device or feature capable of providing a value that may uniquely identify one or more characteristics of the particulate filter assembly 24a is contemplated.

One or more additional sensors, such as sensor 40, may also be provided as part of the exhaust aftertreatment system 12. For example, the additional sensor 40 may be positioned upstream of the particulate filter assembly 24a, as shown, and may be configured to detect a pressure or temperature of the exhaust gas traveling through the exhaust outlet 22. Alternatively, the additional sensor 40 may be positioned downstream of the particulate filter assembly 24a to detect a characteristic of the exhaust stream after it has passed through the particulate filter assembly 24a.

Each of the sensors 26, 28, and 40, and the electronic identification feature 36, and any additional sensors or devices deemed necessary, may be in communication with an electronic controller 42. The electronic controller 42 may be provided for controlling and monitoring operation of the machine 10 and various components of the machine 10, including the internal combustion engine 20 and regeneration or status of the particulate filter assembly 24a. The electronic controller 42 may be of standard design and includes a processor 44, such as, for example, a central processing unit (CPU), a memory 46, and one or more input/output circuits that facilitate communication internal and external to the electronic controller 42. The processor 44 controls operation of the electronic controller 42 by executing operating instructions, such as, for example, computer readable program code stored in memory 46, wherein operations may be initiated internally or externally to the electronic controller 42. A control scheme may be utilized that monitors outputs of systems or devices, such as, for example, sensors 26, 28, and 40, electronic identification feature 36, actuators, or control units, via the input/output circuits to control inputs to various other systems or devices.

The memory 46 may comprise temporary storage areas, such as, for example, cache, virtual memory, or random access memory (RAM), or permanent storage areas, such as, for example, read-only memory (ROM), removable drives, network/internet storage, hard drives, flash memory, memory sticks, or any other known volatile or non-volatile data storage devices located internally or externally to the electronic controller 42. One skilled in the art will appreciate that any computer-based system utilizing similar components is suitable for use with the present disclosure.

The electronic controller 42 may include one or more ports for communicating with the sensors 26, 28, and 40, and the electronic identification feature 36. Specifically, a first port 48 may be in communication with the identification circuit 38 and, therefore, the electronic identification feature 36 via a communication line 50. Similarly, a second port 52, third port 54, and fourth port 56 may be in communication with sensors 26, 28, and 40 via communication lines 58, 60, and 62, respectively. Communication lines 50, 58, 60, and 62 may include wired and/or wireless connections and may facilitate the monitoring of sensors 26, 28, and 40, and electronic identification feature 36.

An engine controller 64 may also be provided and may be in communication with the electronic controller 42 via a communication line 66, which may also include a wired and/or wireless connection. The engine controller 64 may be similar to the electronic controller 42 in both function and design, and may control various aspects of the operation of internal combustion engine 20. For example, the engine controller 64 may control the quantity of fuel injected into each cylinder during each engine cycle, and the ignition timing. In addition, the internal combustion engine 20 may include various sensors, such as, for example, engine speed sensors, load sensors, temperature sensors, and pressure sensors, in communication with the engine controller 64. Further, the engine controller 64 may store characteristics and/or configurations of the internal combustion engine 20.

The electronic controller 42 may also store and execute an aftertreatment assembly diagnostic algorithm for detecting an assembly condition, such as a misassembly, of the exhaust aftertreatment system 12. For example, the aftertreatment assembly diagnostic algorithm may be used for detecting the electronic identification feature 36 of the particulate filter assembly 24a. Specifically, the electronic controller 42 may monitor or detect a characteristic of the identification circuit 38, such as, for example, a resistance or voltage of the identification circuit 38. This electronic identification feature 36 is then compared to an expected value stored in memory 46 to uniquely identify the particulate filter assembly 24a. Further, the electronic controller 42 may compare the uniquely identified particulate filter assembly 24a to a value corresponding to the internal combustion engine 20, which may be provided by the engine controller 64, to determine if the exhaust aftertreatment system is correctly assembled or matched to the internal combustion engine 20. Although the electronic identification feature 36 is shown disposed along the identification circuit 38, it should be appreciated that the electronic identification feature 36 may be disposed along either of the sensor circuits 30 and 32, or any other circuit of the selected aftertreatment component 24. In addition, the electronic identification feature 36 may include any unique characteristic of any of the circuits of the aftertreatment component 24, including any preexisting characteristics.

The electronic controller 42 may generate a positive diagnostic code if the uniquely identified particulate filter assembly 24a matches the expected value. Alternatively, the electronic controller 42 may generate a negative diagnostic code if the uniquely identified particulate filter assembly 24a does not match the expected value. One or both of these diagnostic codes may be displayed on the operator display 16 of the machine 10 to notify the operator of the proper assembly or, alternatively, misassembly of the exhaust aftertreatment system 12. According to one embodiment, it may be desirable to notify the operator only upon detection of a specific assembly condition, such as, for example, a misassembly, of the exhaust aftertreatment system 12. According to a further embodiment, the electronic controller 42 may only generate a negative diagnostic code. Positive feedback may be reflected by the identification of the particulate filter assembly 24a.

A service tool 68, in communication with the electronic controller 42 via port 70 and communication line 72, may also be provided for overriding the identification of the particulate filter assembly 24a. Specifically, the service tool 68 may be used to override any of the electronic identification feature 36, the unique identification of the particulate filter assembly 24a, the value corresponding to the internal combustion engine 20, or any other parameters created or used by the aftertreatment assembly diagnostic algorithm. In addition, the service tool 68 may be used to alter or suppress the diagnostic codes generated by the electronic controller 42, or to disable the aftertreatment assembly diagnostic algorithm altogether. Additional features, such as, for example, using high or low voltage fault codes to detect wiring problems, are also contemplated.

INDUSTRIAL APPLICABILITY

Figure 2:
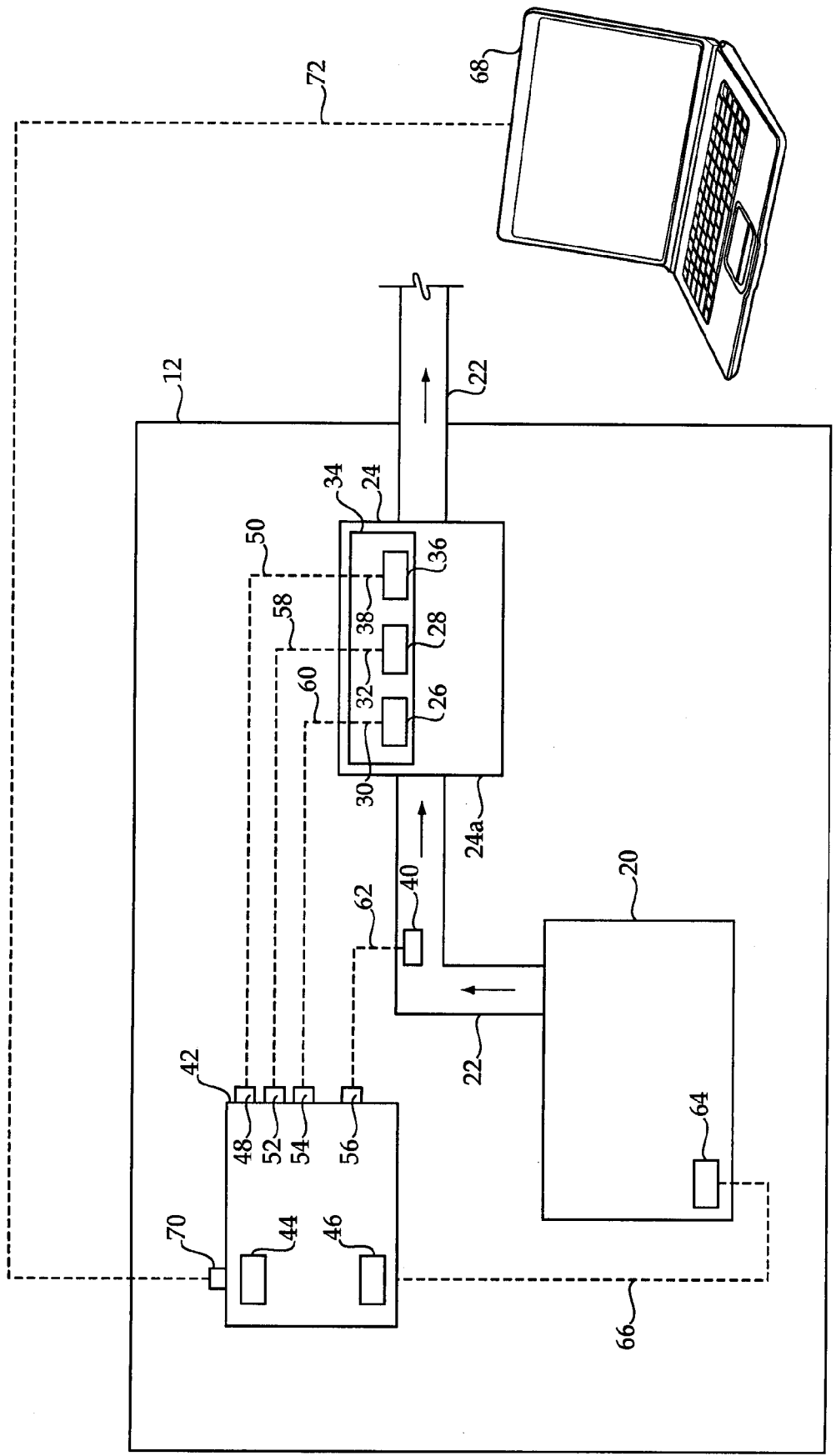
FIG. 2 is a simplified block diagram of an exhaust aftertreatment system of the machine of FIG. 1.

Referring to FIGS. 1 and 2, a machine 10 may be an on-highway or off-highway vehicle, or any other vehicle having an exhaust aftertreatment system 12 for removing various chemical compounds and particulates from exhaust gas produced by an internal combustion engine 20 of the machine 10. An aftertreatment component 24, such as a particulate filter assembly 24a, may be disposed along an exhaust outlet 22 as part of the exhaust aftertreatment system 12 for the internal combustion engine 20. It should be appreciated that the particulate filter assembly 24a may be sized and/or configured to reduce particulate matter emissions from the internal combustion engine 20 an amount necessary to comply with emissions regulations, such as, for example, emissions requirements set forth by the U.S. Environmental Protection Agency (EPA). In fact, the manufacturer of the internal combustion engine 20 may have obtained an emissions certification from the EPA for an engine configuration including both the particulate filter assembly 24a and the internal combustion engine 20.

This may prove problematic, however, for machine assembly plants that assemble several different aftertreatment systems to several different types of engines, especially if two or more of the aftertreatment components have similar mating features. This may also prove problematic for a manufacturer that ships an engine separately from the aftertreatment component 24, such as the particulate filter assembly 24a, for later assembly. Problems may also arise when one or more components of the exhaust aftertreatment system 12 are replaced, such as during routine maintenance of the machine 10. In other instances, the machine assembler may have available two or more different aftertreatment systems available for mating with different engines, but all have similar mating features making misassembly a possibility to be avoided according to this disclosure. If the particulate filter assembly 24a and the internal combustion engine 20 are misassembled, the certification that was based on a specific engine and aftertreatment configuration may no longer be accurate. Utilizing the exhaust aftertreatment system 12 and method for detecting an assembly condition of the exhaust aftertreatment system 12 according to the present disclosure may help to ensure a certified exhaust aftertreatment system 12 has been installed for use with the internal combustion engine 20.

Figure 3:
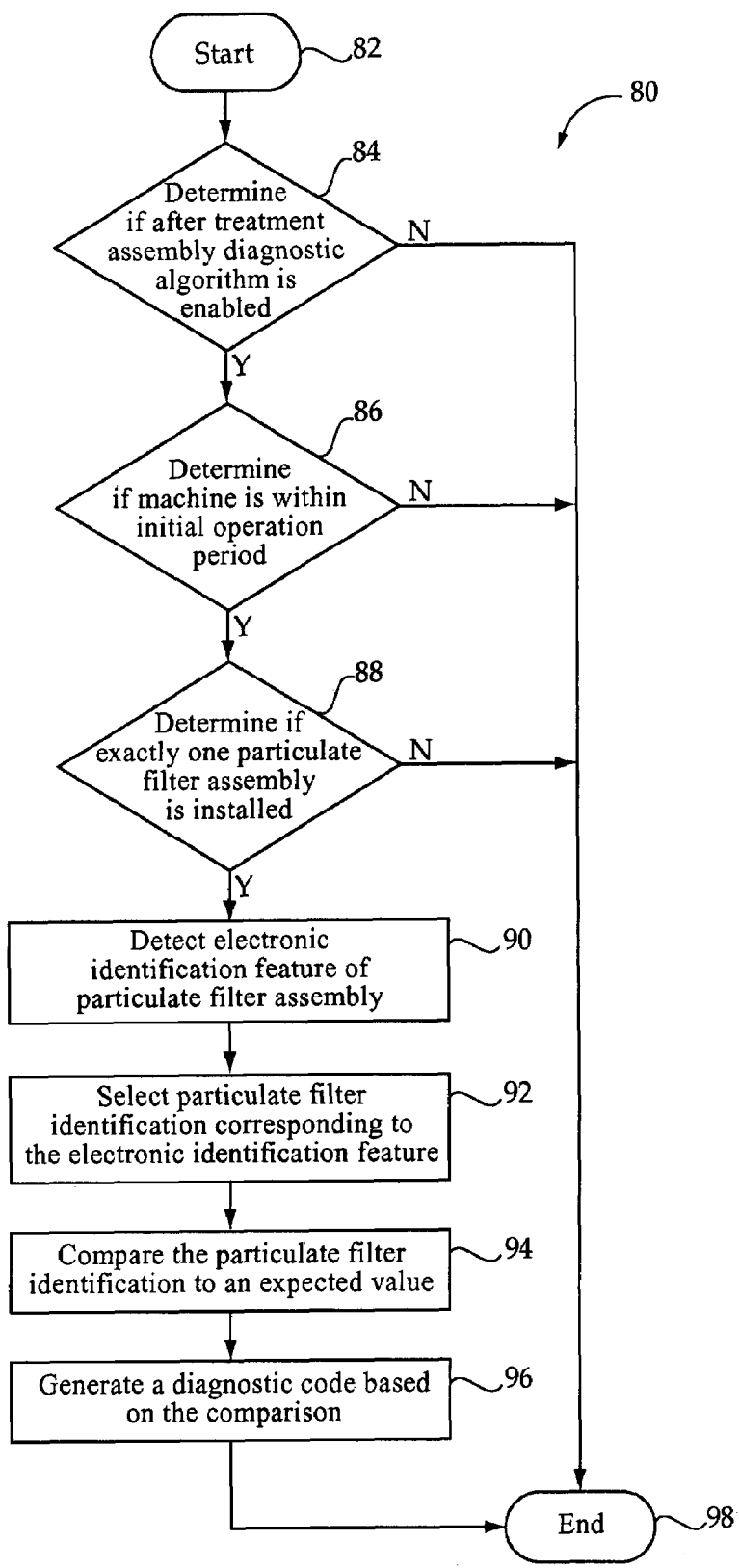
FIG. 3 is a flow chart of one embodiment of a method for electronically identifying the aftertreatment component of FIG. 2.

Turning to FIG. 3, there is shown a flow chart 80 representing an exemplary method of detecting an assembly condition, such as a misassembly, of the exhaust aftertreatment system 12 of FIG. 2. The method may be implemented in whole, or in part, by the electronic controller 42, in combination with the engine controller 64. Each of the controllers 42 and 64 may include a computer usable medium having computer readable code thereon for implementing the method, which may run continuously, at a predetermined frequency, or may be initiated by an operator. It should be appreciated that some of the specified steps of the method may be optional, and any additional steps deemed necessary may be added.

The method begins at a START, Box 82. From Box 82, the method proceeds to Box 84, which includes the step of determining if an aftertreatment assembly diagnostic algorithm is enabled. Specifically, the electronic controller 42 may query a parameter value to determine whether or not to execute the aftertreatment assembly diagnostic algorithm. This parameter may be set manually or, alternatively, may be given a specific value during the operation of the aftertreatment assembly diagnostic algorithm. If the aftertreatment assembly diagnostic algorithm is enabled, the method proceeds to Box 86. If the aftertreatment assembly diagnostic algorithm is not enabled, the method proceeds to an END, at Box 98.

At Box 86, the electronic controller 42 determines if the machine 10 is operating within an initial operation period. Specifically, it may be desirable to execute the aftertreatment assembly diagnostic algorithm during a predetermined number of operation hours of the machine 10. According to one embodiment, it may be desirable to disable the aftertreatment assembly diagnostic algorithm after about 100 hours of engine operation. According to a further embodiment, it may be desirable to disable the aftertreatment assembly diagnostic algorithm after a time period deemed sufficient to ensure assembly of the exhaust aftertreatment system 12 of the machine 10. It should be appreciated that numerous methods and control schemes for determining when to enable or, alternatively, disable the aftertreatment assembly diagnostic algorithm are contemplated. If the electronic controller determines the machine is within the initial operation period, the method proceeds to Box 88. If, however, the machine is not within the initial operation period or, alternatively, no initial operation period is defined, the method proceeds to the END, at Box 98.

At Box 88, the electronic controller 42 determines if exactly one particulate filter assembly 24a, or other aftertreatment component 24, is installed. For example, it may be desirable to utilize an additional or alternative algorithm in applications that include a plurality of particulate filter assemblies. Alternatively, it may be desirable to presume that the use of multiple particulate filter assemblies provides the desired reduction of particulates from the internal combustion engine 20. Therefore, if more than one particulate filter assembly, such as particulate filter assembly 24a, is detected, the method may proceed to the END, at Box 98. Alternatively, if exactly one particulate filter assembly 24a is detected, the method proceeds to Box 90.

At Box 90, the aftertreatment assembly diagnostic algorithm may be executed. Specifically, the electronic identification feature 36 of the particulate filter assembly 24a is detected. This may include the electronic controller 42 establishing communication with the identification circuit 38 of the particulate filter assembly 24a. The electronic identification feature 36 may include a resistor or other component that uniquely identifies the particulate filter assembly 24a. According to one embodiment, the electronic identification feature 36 may include a predetermined resistance, such as that caused by a resistor, along the identification circuit 38. According to a further embodiment, the electronic identification feature 36 may include a predetermined voltage of the identification circuit 38. According to yet another embodiment, the electronic identification feature 36 may include a predetermined voltage of one of the sensor circuits 30 and 32. It should be appreciated that any electronic device or feature capable of providing a value that may uniquely identify the particulate filter assembly 24a is contemplated.

At Box 92, a particulate filter identification corresponding to the electronic identification feature 36 is selected. For example, the aftertreatment assembly diagnostic algorithm may reference a table, such as table 100 of FIG. 4, to select a particulate filter identification corresponding to the detected electronic identification feature 36. According to one embodiment, the electronic identification feature 36 may include a voltage, such as the voltages listed in column 102 of the table 100. The method then selects an aftertreatment component identification or, more specifically, a particulate filter identification, such as a particulate filter serial number from column 104 of the table 100, that corresponds to the detected voltage. It should be appreciated that the particulate filter serial number may, for example, include a series of alphanumeric characters. It should also be appreciated that a subset of the particulate filter serial number may uniquely identify a particulate filter, such as particulate filter assembly 24a.

At Box 94, the particulate filter identification, such as a particulate filter serial number selected from column 104 of table 100, is compared to an expected value stored in memory 46. The expected value, for example, may include a value corresponding to the internal combustion engine 20. This value may be provided by the engine controller 64, or may be stored in the memory 46 of the electronic controller 42. After the comparison at Box 94, the method proceeds to Box 96.

At Box 96, the electronic controller 42 may generate a positive diagnostic code if the uniquely identified particulate filter assembly 24a matches the expected value. Alternatively, the electronic controller 42 may generate a negative diagnostic code if the uniquely identified particulate filter assembly 24a does not match the expected value. One or both of these diagnostic codes may be displayed on the operator display 16 of the machine 10 to notify the operator of the proper assembly or, alternatively, misassembly of the exhaust aftertreatment system 12. According to one embodiment it may be desirable to generate and display only a negative diagnostic code. It should be appreciated that positive feedback may be indicated by the identification of the particulate filter assembly 24a and/or the matching of the particulate filter assembly 24a to the expected value.

In addition, it may be desirable to derate the internal combustion engine 20 a predetermined percentage upon detection of a misassembled particulate filter assembly 24a. Specifically, an output of the internal combustion engine 20 may be limited to compensate for a misassembled particulate filter assembly 24a that is not capable of reducing particulate matter emissions according to emissions regulations. This derating may limit the particulate matter emissions from the internal combustion engine 20, thus allowing the machine 10 to remain in compliance with governmental regulations.

It should be appreciated that a service tool 68 may be provided for overriding any of the electronic identification feature 36, the unique identification of the particulate filter assembly 24a, the value corresponding to the internal combustion engine 20, or any other parameters created or used by the aftertreatment assembly diagnostic algorithm. For example, if there is an electrical problem or if a particulate filter assembly is replaced after the initial operation period, it may be desirable to program the unique identification of the particulate filter assembly 24a into the electronic controller 42. In addition, the service tool 68 may be used to alter or suppress the diagnostic codes generated by the electronic controller 42, or to disable the aftertreatment assembly diagnostic algorithm altogether. After the aftertreatment assembly diagnostic algorithm has executed, the method proceeds to an END, at Box 98.

The exhaust aftertreatment system 12 and method for detecting an assembly condition, such as a misassembly, of the exhaust aftertreatment system 12 according to the present disclosure provide an efficient means for ensuring compliance with increasingly stringent emissions regulations. Specifically, the method provides a means for detecting an aftertreatment component 24, such as a particulate filter assembly 24a, and determining if a configuration including the particulate filter assembly 24a and the internal combustion engine 20 complies with emissions regulations. The method may be executed after initial assembly of the exhaust aftertreatment system 12, after replacement of one or more components of the exhaust aftertreatment system 12, or periodically or continuously during the life of the internal combustion engine 20 and/or machine 10. Upon detection of a misassembly, the method also provides a means for notifying an operator of the machine 10, and, according to some embodiments, an incentive for correcting the misassembly, such as by derating the performance of the internal combustion engine 20 an amount sufficient to maintain compliance.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A particulate filter assembly, comprising:
 at least one sensor circuit configured to communicate with an electronic controller;
 at least one identification circuit configured to communicate with the electronic controller; and
 at least one resistor causing a predetermined resistance disposed along the identification circuit, wherein the predetermined resistance is indicative of a characteristic of the particulate filter assembly.

2. The particulate filter assembly of claim 1, wherein the at least one sensor circuit is a first sensor circuit, and wherein a pressure sensor is disposed along the first sensor circuit.

3. The particulate filter assembly of claim 1, further including a second sensor circuit, and wherein a temperature sensor is disposed along the second sensor circuit.

4. A method of detecting an assembly condition of an exhaust aftertreatment system of a machine, comprising:
   executing an aftertreatment assembly diagnostic algorithm;
   detecting an electronic identification feature of an aftertreatment component of the exhaust aftertreatment system; and
   comparing the electronic identification feature to an expected value.

5. The method of claim 4, further including executing the aftertreatment assembly diagnostic algorithm during an initial operation period of the machine.

6. The method of claim 4, further including:
   generating a positive diagnostic code if the electronic identification feature is a match to the expected value; and
   generating a negative diagnostic code if the electronic identification feature is a mismatch to the expected value.

7. The method of claim 6, further including displaying the negative diagnostic code on an operator display.

8. The method of claim 4, further including establishing communication between an identification circuit at least partially attached to the aftertreatment component and an electronic controller.

9. The method of claim 8, wherein the detecting step includes determining a resistance in the identification circuit.

10. The method of claim 8, wherein the detecting step includes determining a voltage from at least one resistor disposed along the identification circuit.

11. The method of claim 4, wherein the comparing step includes selecting an aftertreatment component identification corresponding to the electronic identification feature from a memory, and comparing the aftertreatment component identification to the expected value.

12. The method of claim 11, wherein comparing the aftertreatment component identification includes comparing the aftertreatment component identification to a value corresponding to the internal combustion engine of the machine.

13. The method of claim 11, further including overriding the aftertreatment component identification using a service tool.

14. A machine, comprising:
   an internal combustion engine having an exhaust outlet;
   an aftertreatment component disposed along the exhaust outlet, wherein the aftertreatment component includes an identification circuit and an electronic identification feature;
   an electronic controller including a first port in communication with the identification circuit, wherein the electronic controller includes an aftertreatment assembly diagnostic algorithm and is configured to detect the electronic identification feature and compare the electronic identification feature to an expected value stored in a memory.

15. The machine of claim 14, wherein the aftertreatment component further includes a sensor circuit, and wherein the electronic controller further includes a second port in communication with the sensor circuit.

16. The machine of claim 14, wherein the electronic identification feature includes a predetermined resistance caused by at least one resistor disposed along the identification circuit.

17. The machine of claim 16, wherein the expected value includes a value corresponding to the internal combustion engine of the machine.

18. The machine of claim 17, wherein the electronic controller is further configured to generate a positive diagnostic code if the electronic identification feature is a match to the expected value, and generate a negative diagnostic code if the electronic identification is a mismatch to the expected value.

19. The machine of claim 18, further including an operator display, wherein the electronic controller is further configured to display the negative diagnostic code on the operator display.

20. The machine of claim 19, further including a service tool configured to facilitate an override of the negative diagnostic code.

\* \* \* \* \*